US009825763B2

United States Patent
Kurian et al.

(10) Patent No.: US 9,825,763 B2
(45) Date of Patent: Nov. 21, 2017

(54) SYSTEMS FOR AUTOMATED FORENSIC DATA CAPTURE

(71) Applicant: Bank of America Corporation, Charlotte, NC (US)

(72) Inventors: Manu J. Kurian, Dallas, TX (US); Sorin N. Cismas, Southlake, TX (US); Kalpesh V. Patel, Marlboro, NJ (US); Ray A. Edwards, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 80 days.

(21) Appl. No.: 14/942,564

(22) Filed: Nov. 16, 2015

(65) Prior Publication Data

US 2017/0139972 A1 May 18, 2017

(51) Int. Cl.
| | |
|---|---|
| *G06F 21/00* | (2013.01) |
| *H04L 9/32* | (2006.01) |
| *G06Q 50/26* | (2012.01) |
| *H04L 29/06* | (2006.01) |
| *H04L 9/14* | (2006.01) |

(52) U.S. Cl.
CPC ............ *H04L 9/32* (2013.01); *G06Q 50/26* (2013.01); *H04L 9/14* (2013.01); *H04L 63/0435* (2013.01); *H04L 63/105* (2013.01)

(58) Field of Classification Search
CPC ..... G06F 17/30368; G06Q 50/26; H04L 9/32; H04L 9/14; H04L 63/0435
See application file for complete search history.

(56) References Cited

U.S. PATENT DOCUMENTS

| | | | | |
|---|---|---|---|---|
| 8,572,050 | B2 * | 10/2013 | Graziani | G06F 17/30144 707/687 |
| 8,856,077 | B1 * | 10/2014 | Roth | G06F 9/5072 707/638 |
| 2015/0312356 | A1 * | 10/2015 | Roth | G06F 11/3006 709/226 |
| 2016/0328577 | A1 * | 11/2016 | Howley | G06F 19/322 |

\* cited by examiner

*Primary Examiner* — Mahfuzur Rahman
(74) *Attorney, Agent, or Firm* — Banner & Witcoff, Ltd.; Michael A. Springs (57) ABSTRACT

Systems for the automated capture of forensic data information are presented. An example system may receive an access/modification request directed to a data item(s), generate an initial data capture record for the data item(s), and send the record to an isolated, secure data preservation module before granting the request. After the access/modification, the system may generate a post-access data capture record and send it to the preservation module. The system may determine the content of the generated records, based on, e.g., content of the data item(s), before generation. For example, the system may determine a first content type for records where data item(s) include critical data, and a second content type for records that do not, to, e.g., efficiently allocate system resources while minimizing any disruption to an accessing user. The system may also utilize different encryption and decryption key techniques based on, e.g., the content of the data item(s).

16 Claims, 5 Drawing Sheets

SYSTEMS FOR AUTOMATED FORENSIC DATA CAPTURE

BACKGROUND

Many organizations utilize systems to maintain, store, and modify electronic data. While electronic data formats allow certain advantages, drawbacks exist. In many cases, a document (or other data) is created, modified, stored and accessed entirely in electronic form: no physical, hard copies exist. When changes are made, there may be no record of what the changes were, and the original or prior content may be substantially or completely lost.

Yet organizations need the ability to review electronic data and changes thereto, particularly for important and/or sensitive data. For example, an organization may require the ability to review and assess a modifier's compliance or performance, and/or verify that no improper modifications were made, whether through inadvertence or malfeasance. And this post-modification review may not be necessary until long after a modification is made, for example if a potential mistake and/or improper modification is not immediately suspected or identified. What's more, any systems for review need to be secure, as otherwise a user could, potentially, take steps to cover up improper modifications. In sum, systems that provide a long-term, reliable, and secure ability for organizations to discern and evaluate modifications to electronic data are necessary. At the same time, however, such systems should not hinder or obstruct a user's ability to view, utilize and alter data as needed for legitimate purposes, nor should they unduly burden or unnecessarily overuse the bandwidth/storage capabilities of the organization.

SUMMARY

The following presents a simplified summary of the present disclosure in order to provide a basic understanding of some aspects of the present disclosure. This summary is not an extensive overview of the present disclosure. It is not intended to identify key or critical elements of the present disclosure or to delineate the scope of the present disclosure. The following summary merely presents some concepts of the present disclosure in a simplified form as a prelude to the more detailed description provided below.

Some aspects of the disclosure provide an automated forensic data capture system. The system may provide for the generation and preservation of one or more data capture records related to and/or based on one or more data items, for example in response to the modification of data item(s), or the access of such item(s). The system may include at least one processor, a communication interface communicatively coupled to the at least one processor, and memory storing computer-readable instructions. When the instructions are executed by the at least one processor, they may cause the system to perform various actions.

In an example set of actions, the system may first receive, via the communication interface, an access request from a data access module, the access request being directed to one or more data items stored on the data capture system (e.g. in the memory). Then, the system may generate an initial data capture record for the one or more data items, and send, via the communication interface, the initial data capture record to an isolated data preservation module. After the generation of the initial data capture record, the system may grant the access request. Then, the system may, responsive to a determination that the one or more data items are no longer being accessed, generate a post-access data capture record for the one or more data items. Next, the system may send, via the communication interface, the post-access data capture record to the data preservation module.

In certain examples, the instructions may cause the system to determine, prior to the generation of the initial data capture record and the post-access data capture record, the content of the generated initial data capture record and the generated post-access data capture record. The determined content for each record may be based on an analysis of the one or more data items. In various embodiments, the system, based on the analysis of the one or more data items, and responsive to a determination that the one or more data items include critical, sensitive, or confidential data (or a combination thereof), a first content type is determined for the generated initial data capture record and the generated post-access data capture record. On the other hand, in this example, based on the analysis of the one or more data items, and responsive to a determination that the one or more data items do not include critical, sensitive, or confidential data (or a combination thereof), at least a second content type is determined for the generated initial data capture record and the generated post-access data capture record (for example, a record type with relatively less content as compared to the first content type).

In certain examples, the determined content of the generated initial data capture record and the generated post-access data capture record includes a full forensic copy of the one or more data items, a content copy of the one or more data items, a content copy of information in the one or more data items designated as capture information, a structure copy of the one or more data items, a screen-shot of the one or more data items, a metadata capture of the one or more data items, a command log of commands executed by the data access device after the access request was granted, or a combination thereof.

In various embodiments of the system, the instructions further cause the system to encrypt the generated initial data capture record and the generated post-access data capture record. In some examples, the instructions further cause the system to, based on an analysis of the one or more data items, determine a level of encryption for the initial data capture record and the post-access data capture record prior to the encryption. In certain examples, responsive to a determination that the one or more data items include critical, sensitive, or confidential data, or a combination thereof (based on the analysis of the one or more data items), the level of encryption is 256 bit symmetric encryption, and the initial data capture record and the post-access data capture record includes a full forensic copy of the one or more data items. On the other hand, in this example, responsive to a determination that the one or more data items do not include critical, sensitive, or confidential data, or a combination thereof, the level of encryption is 128 bit symmetric encryption, and the initial data capture record and the post-access data capture record includes a command log of any commands executed by the data access device after the access request was granted.

In certain embodiments of the system, multiple generated keys are required to decrypt the encrypted capture records. For example, the instructions may cause the system to determine, based on an analysis of the one or more data items, the types of keys required for decryption and generate such keys. In some examples, responsive to a determination that the one or more data items include critical, sensitive, or confidential data, or a combination thereof (based on the analysis of the one or more data items) the determined and generated keys may include one or more vertical approval keys. On the other hand, in this example, responsive to a determination that the one or more data items do not include critical, sensitive, or confidential data, or a combination thereof, the determined keys may solely consist of horizontal approval keys, or include one or more horizontal approval keys. In another example, the instructions may further cause the system to, responsive to a determination that the one or more data items are no longer being accessed by the data access module, send, via the communication interface, a notification that the one or more data items were accessed.

In accordance with another aspect, data capture methods are disclosed. In some examples, a method includes receiving, by a data capture device, an access request from a data access device, the access request being directed to one or more data items stored on the data capture device. The data capture device may then grant the access request. Next, by the data access device, the one or more data items are modified through one or more modification commands. Responsive to a determination that the one or more data items are no longer being modified, the method may include generating, by the data capture device, a post-modification data capture record for the one or more data items, and sending, by the data capture device, the post-modification data capture record to a data preservation device. The method may also include generating and sending an initial data capture record. In some examples, the post-modification data capture record includes a log of the one or more modification commands. The method may also include sending, by the data capture device, a notification that the one or more data items were modified. In certain examples, one or more data items include one or more message records, web service call records, document records, other record files, or other documents.

In another example method, a data capture device may receive an access request from a data access device, the access request being directed to data items (or a single data item) stored on the data capture device. Next, the data capture device may grant the access request, and then receive a modification request from the data access device directed to one or more data items. Then, the data capture device may generate an initial data capture record for the one or more data items that are the subject to the modification request, and subsequently grant the modification request. In this example, the data capture device may then generate a post-modification data capture record for the one or more of the data items that were the subject of the granted modification request, and send the initial data capture record and the post-modification data capture record to a data preservation device.

In accordance with additional aspects, one or more specialized modules and/or devices (or systems comprising one or more such modules/devices), which may include one or more processors and/or memories, are configured to perform one or more steps of methods discussed above.

These summary descriptions are merely provide examples of the systems, methods and/or method steps that may be performed in one or more embodiments. In certain embodiments, systems and methods include additional combinations or substitutions. To that end, other details and features will be described in the sections that follow. Any of the features discussed in the embodiments of one aspect may be features of embodiments of any other aspect discussed herein. Moreover, additional and alternative suitable variations, features, aspects and steps will be recognized by those skilled in the art given the benefit of this disclosure.

BRIEF DESCRIPTION OF THE DRAWINGS

Embodiments providing examples of the disclosure will now be described by way of example only and with reference to the accompanying drawings, in which.

DETAILED DESCRIPTION OF EMBODIMENTS

The embodiments described herein provide systems, methods and apparatuses. In accordance to some aspects, the systems, methods and apparatuses relate to techniques for the automated capture and preservation of forensic data for electronic data items. These and other aspects, features and advantages of certain embodiments will be further understood by those skilled in the art from the following description of embodiments, which provide examples of the systems, methods and/or methods steps that may be performed in some embodiments. In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
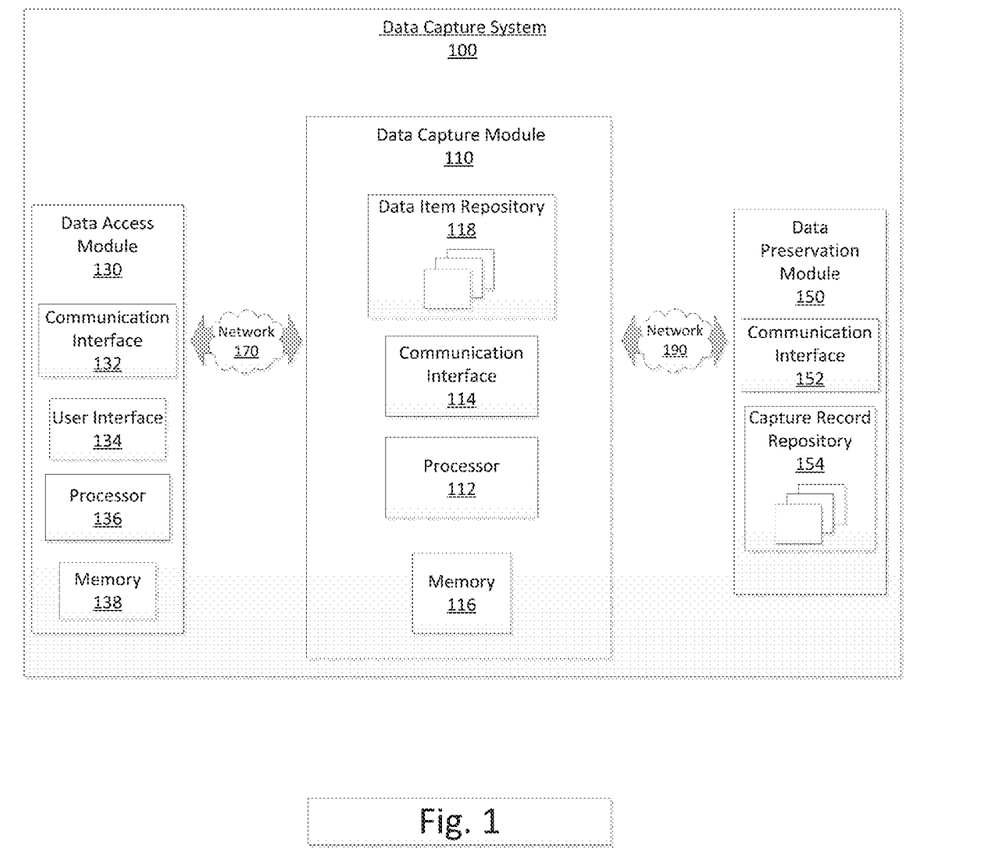
FIG. 1 illustrates a schematic diagram of an example embodiment of an automated forensic data capture system.

In accordance with one aspect, systems are provided for the capture and preservation of forensic data. FIG. 1 show a schematic diagram of an illustrative embodiment of the system. In this example, system 100 includes a data access module 130, a data capture module 110, and a data preservation module 150. These may hardware components or modules that are connected via digital telecommunication (e.g. the capture and preservation modules are specialized servers). In this example, the data capture module 110 includes one or more processors 112, at least one communication interface 114, and memory 116. The memory 116 may include one or more computer-readable storage media. The memory may store computer-readable instructions (as in memory 116 of the example embodiment of FIG. 1) and/or computer-readable data (i.e., information that may or may not be executable), whether in one medium or in a combination of mediums. In some examples, the media may include or more hard disks, CD-ROMs, optical storage devices, magnetic storage devices, and/or any combination thereof. In this example embodiment, the data capture module includes separate a data item repository 118 (on an appropriate computer-readable storage media), but in some examples the data items are stored on the memory 116 in conjunction with the instructions. In other examples, the data item repository is stored on another storage module that is accessed by the data capture module. In these examples, the storage module controls, limits, and/or prevents a user's access of the stored data items, via the data access module, such that the capture module may generate records as describe herein in conjunction with, prior to (or even after) access/modification by the user.

In this example, the communication interface 114 may include a network adapter, modem or other means for establishing communications over a network (whether through network links, dial-up links, wireless links, hard-wired links, and the like), such as network 170 between the data capture module 110 and the data capture module 130. In certain examples, the network 170 is an intranet, a local-area network (LAN), a virtual private network (VPN), or any combination of any of the same. In some examples, however, there is no network connection between the data access module 130 and the data capture module 110, and these are merely separate components or aspects of the same apparatus (e.g. a user interface acts as the data access module used to access data items stored with or accessed through the data capture module) but, as described in more detail below, any attempts to access or modify data items must go through the data capture module. In certain examples, the data capture module is a server, such as a specialized storage server for data items.

In this example, the data access module 130 includes a communication interface 132, a user interface 134, at least one processor 136, and memory 138 (where, e.g. the communication interface, memory, and processor may include any of the characteristics described above in relation to the analogous components of the data capture module). In this example, the data preservation module 150 includes a communication interface 152 and memory comprising a capture record repository 154. In some examples (such as embodiments where the data preservation module encrypts its received records) the data preservation module also includes at least one processor.

In certain examples, the network 190 is the same type of network as network 170 (or, in some examples, is simply another portion of the same network 170), while in others it is different. In certain examples, network 190 is a dedicated network connection solely between the data capture module and the data preservation module. In some examples, however, there is no network connection between the data preservation module 150 and the data capture module 110, and these are merely separate components or aspects of the same apparatus. However, the data preservation module is preferably separate from and cannot be accessed by the data access module (in other examples, however, it can be accessed, but security procedures such as file encryption protect the stored contents of the data preservation module). In certain examples, the data preservation module is a server, such as a specialized, secure, and isolated storage server for data capture records related to one or more data items. But, in some examples, the data access module and data capture module may be components of the same device (and, possibly, also including the data preservation module).

The systems may be configured to perform various data capture methods, as illustrated in the example methods describe herein, where one or more records related to the data item(s) and/or modifications thereto are generated and preserved for, e.g. future analysis. The steps that are depicted in the example methods shown in FIGS. 2-5 may be implemented by one or more of the modules from FIG. 1. For example, the memory of a system module may store instructions that, when executed by a processor, further cause the system to perform one or more steps of the methods describe herein.

Figure 2:
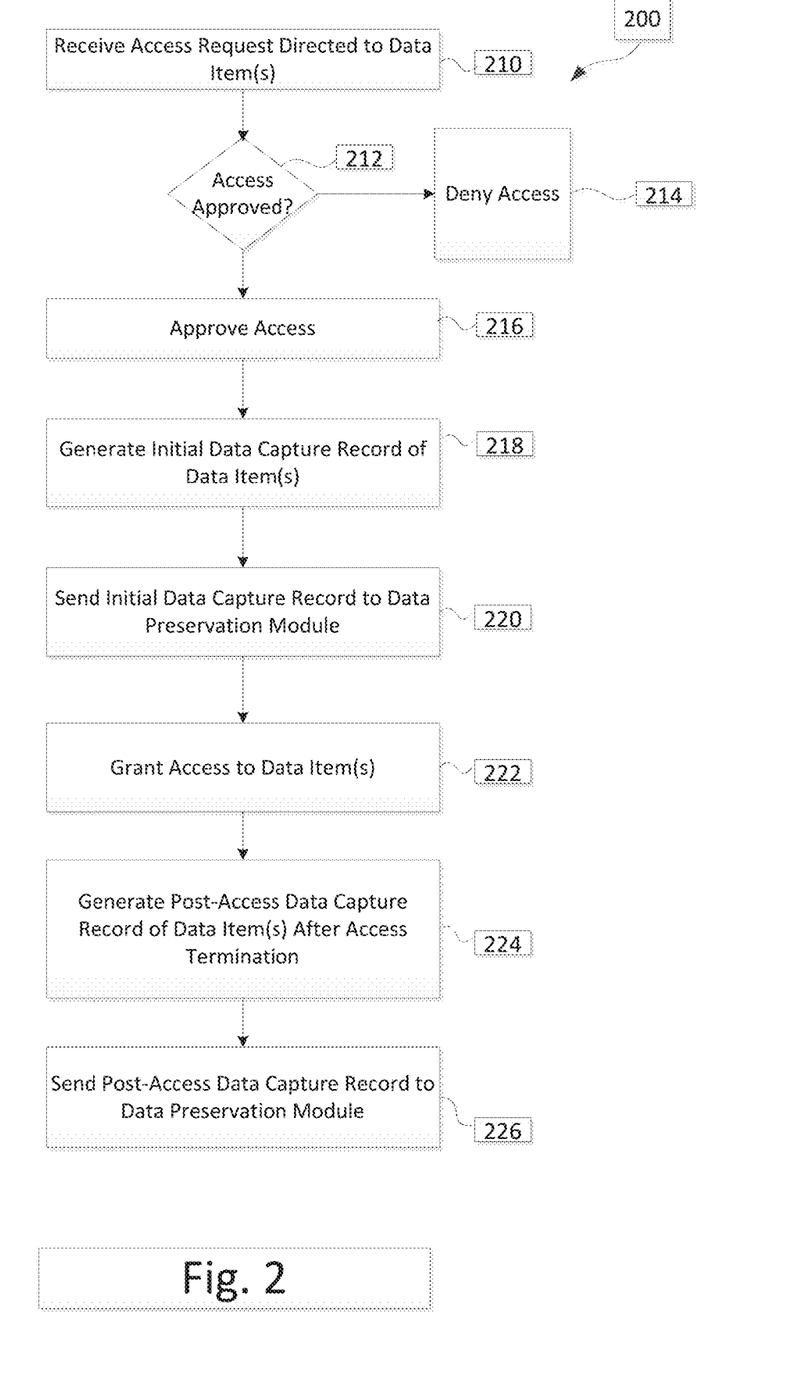
FIG. 2 is a flowchart of an example method that may be implemented in accordance with one or more embodiments of the automated data capture system.

FIG. 2 shows an example method 200 performed by an example of the data capture system, where in step 210, an access request directed to one or more data items is received (through, e.g. a communication interface) by a data capture module. A user seeking to view, edit, manage, revise, or otherwise work with the data items may send the request through a data access module (for example, a workstation in communication with a data capture server storing the one or more data items). The relevant data items may be selected by the user through a user interface. The data item(s) may be any type of electronic data, including, for example, message records, web service call records, document records, other files, documents, or record files, or any other payload/data. Thus, the data capture module may be tied to or utilize varies known file transfer techniques or web services (e.g. FTP). In certain examples, the system provides data capture information for messages or other files that, otherwise, could be changed via manual processes with no ability to subsequently view or evaluate the prior versions of the, e.g., message or the changes thereof.

In some examples, the data capture module is a server or other component that runs an existing product or program for accessing/modifying the relevant type of data item(s). In certain examples, the data capture system features are added by incorporating the technical components of the various modules and also adding the necessary code through an API (application program interface) for the existing product. As an example, a message management utility allow users to access message records on a data server (via an action similar to step 210) may provide a foundation for the instruction code added through an API that, when executed by the server (which acts as the data capture module in this example) causes the server and other relevant modules to perform the necessary actions for the system's methods of preservation.

In this manner, the system may advantageously perform the data capture actions described herein but not excessively hinder a user's typical manner of accessing/modifying the relevant data items, or require a user to perform additional actions that are unfamiliar or require additional time investment. Nor does the system require the use of additional or unfamiliar products/programs. In such examples, however, the relevant hardware components would also need to be added (e.g. the isolated data preservation server) in addition to the changes made via the API to the existing product.

In examples utilizing an existing data management product that lacks a sufficiently mature API to make such changes, or where other implementations are desired, the systems may utilize other techniques as described herein, such as utilizing log copying (e.g. scraping and saving command logs, access logs, and so on) to provide this information via data capture records listing the log information. As another example, metadata information may be captured, or screen-scraping may be used, for example where screen caps, screenshot, or images are periodically saved, or pre- and post-access screen caps/images are saved as the capture records. In yet other examples, a direct intercept process may be used, for example where the system receives a modification command (e.g. "delete") directed to the content or structure of the data item, and the data capture module generates an initial and a post-access capture record, preserving the data item both before execution of the command and after the modification. In certain of these examples, the instructions include direct integration of these features (i.e. a "command in system" set-up), where the capture records are generated before passing the data item to the downstream process.

Thus, by generation of capture records the system may provide consistent, common data record artifacts, regardless of the data item(s) at issue or the products used to access/ modify them, that allow comparison, analysis, and audits of data item modifications. In some examples, this provides the ability to utilize the data capture records for heuristic analysis, analyzing the records to provide useful information about data modification, and so on. The system can then, for example, analyze the data manipulation trends, via examination of a plurality of data capture records, to determine patterns or identify necessary corrective actions.

Referring back to FIG. 2, in optional step 212, the system implementation may include an access approval determination, where the user/workstation/location (and/or like information) of the data access request may be evaluated by the data capture module to determine if access to the selected data items is authorized by the data capture module. This can advantageously also control the access to relevant data items via the same module that provides the data capture records and features. For one example, a data capture module may compare a user login seeking access to a list of authorized users, or determine whether the user login corresponds to position or title meeting or exceeding an authorized security level. The access requirement may be the same for all data items stored on the data capture module, or may vary based on the type of data item, the content therein, and so on. In these and similar examples, if the user/location (or any other attempted access characteristic) is determined to not meet the access requirement(s) for the data items, in step 214 the access request is denied and the process ends.

In this example, if access is approved, as in step 216, however, in this example the data capture module may next generate an initial data capture record for the one or more data items. In this manner, the system preserves an earlier form of the data item (or other information related to the item) if subsequent review and/or comparison is later necessary. In other examples, however, as described below, the generation of the initial capture record is based on the intercept, receipt, and/or detection of a command that would alter the content and/or structure of a data item, (e.g. a "delete" command, "get" command, "put" command, and the like) rather than simply being tied to the access of the item.

The content and type of the initial data capture record can vary based on the data item itself. For example, for data items storing sensitive, confidential, or otherwise critical information in the data items, a more comprehensive preservation of the initial data may be necessary. At the same time, for less important data, it may be desirable to allocate fewer network and storage resources to the capture records, meaning less information is generated and preserved. In embodiments where the determination of the generated capture record type is based on an analysis of the data item (as described herein), this advantageously preserves resources for less critical items, while still allowing preservation, and ensuring that sufficient record preservation is performed for other data items.

In some examples, the generated initial data capture record (and/or the generated post-access data capture record) includes a full forensic copy of the one or more data items, i.e. a complete copy of the data item prior to its access. This, for example, would preserve the ability to review changes solely made to the structure of a data item (e.g. switching various values in a column of a file, but where the content of the document is not changed). In other examples, the record includes one or more of a content copy of the one or more data items, or a content copy of any information in the one or more data items designated as capture information (e.g. if specific content was designated as sensitive, confidential, or critical such that record capturing is necessary, section(s) of such content would be captured).

In others, the record may include a structure copy of the one or more data items, a screen-shot of the one or more data items (for example, as the item appears to a user via a user interface), and/or a line item copy of any changes made to the document (to reflect, e.g. a rearrangement of data in one or more lines of a document, such as switching numerical values between two entities or field, or alterations to content in one or more lines, such as changing the numerical value). In some examples, the record may include a metadata capture for the one or more data items (to reflect, e.g. name, user name, access device, access department, contact information, time of access/modification, or other information related to the access/modification of the data item), a command log of any commands executed by the data access device after the access request was granted, or a combination of any of the above examples. In some examples, the data is transformed into another form, for example one more amenable to encryption and/or storage, or to eliminate content not required for the capture record type, or to data with other different properties.

These representative capture records illustrate the granular control of the system, and the system thus can advantageously generate different capture records for different data items to efficiently utilize system resources. The records may therefore include a variety of information, whether every single character of the data item, the content with or without its arrangement, basic content (e.g. the results of formulas without capturing the underlying formula), various metadata, and the like.

In the example of FIG. 2, in following step 220, the data capture module sends the generated initial data capture record (via, e.g. the communication interface) to a data preservation module. In some examples, the data preservation module is an isolated component or device (e.g. a secure server, or an isolated module that other cannot be directly accessed by the data access module, even if the modules are combined in a single device). In various examples, any data access modules typically used to access/modify the data items cannot access the data preservation module. In some examples, completely separate network connections exist between the data access module and data capture module, on one hand, and the data capture module and the data preservation module, on the other. In some examples, only after the generation of the initial data capture record (although this may occur either before or after the record is sent in various examples) in step 222 does the data capture module grant access to the data items.

In certain examples, however, to further the user's efficiency and avoid delays in the user's access to the one or more data items, the system may grant access to the data items prior to the generation of the initial data capture record. In these examples, the system may subsequently capture the necessary information (e.g. copy the data item) about the prior form of the item before the user saves any of their modifications. For example, a temporary version of the data item may be created and used for the record generation, or the original data form as already stored in memory is used before the user later saves their modifications. In these examples, the system advantageously provides efficient access but still ensures preservation of the appropriate information about the data item. If, in these examples, the user completes their modifications before the generation of the initial data capture is complete, the data capture module may store the edited data item in a queue until the generation of the initial data capture is complete, and only then replace the prior stored version of the data item.

In this example, the data capture module may then determine when the one or more data items are no longer being accessed, or may determine that one or more modifications have been made to the content, structure, and/or properties of the data item(s). In other examples, the data capture module may receive a notification that the data access module has terminated its access to the data item(s) (or the data capture module may terminate access after a particular amount of time has passed since access began, the last modification, or some other event). In this example, in step 224 the data preservation module next generates a post-access data capture record for the one or more data items. Thus, in these examples, the system also preserves any modifications to the data items for future review, for example if another user subsequently re-opens/modifies the relevant data items. Then, in step 226, the data capture modules sends (via, e.g. the communication interface) the post-access data capture record to the data preservation module. In certain examples, both the initial and post-access generated data capture records are sent only after the user completes their access and/or modification of the data items.

Figure 3:
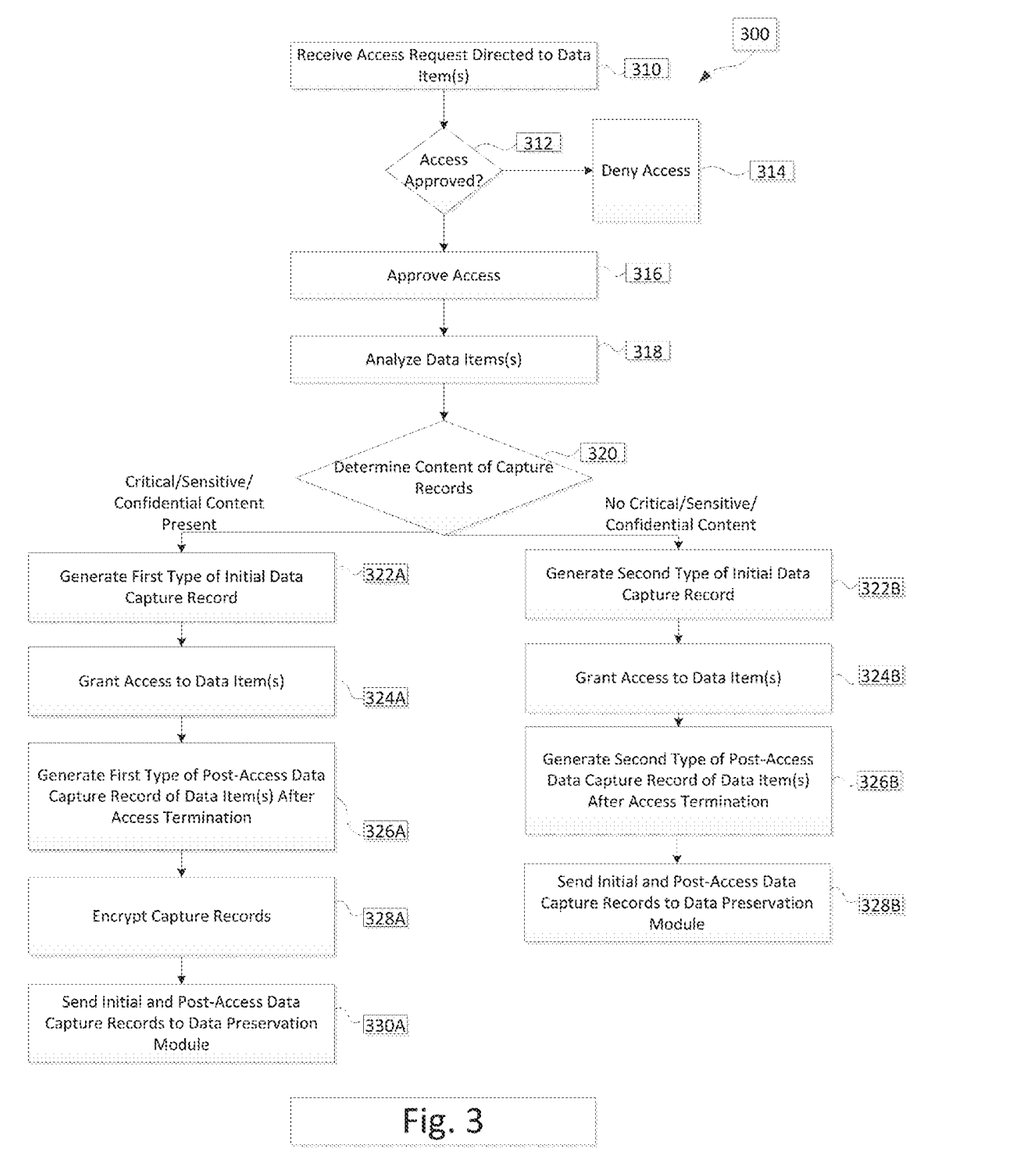
FIG. 3 is a flowchart of an example method that may be implemented in accordance with one or more embodiments of the automated data capture system.

FIG. 3 illustrates another example implementation (method 300) that may be performed by embodiments of the data capture system. In this example, the initial steps 310-316 correspond to the analogous steps 210-216 of the example method of FIG. 2. In this example, however, after the access request is approved, the data capture module then analyzes the data item(s) that are the subject of the access request. This may include an analysis of the type of data item, all the content of the data item, important or flagged content of the data item (e.g. information designed as "capture" information or otherwise identified as requiring a certain preservation action, for example the creation of a particular data capture file type), certain properties of the data item (e.g. whether it is saved under a particular matter or in a particular organization department, whether the creator designated it as "private" or as requiring a particular data capture record generation, gave it a certain security setting, and the like), the identification of the creator of the data item, and the like.

In this example, subsequent to this analysis, in step 320 the content of the generated initial data capture record and the generated post-access data capture record may be determined, based on the analysis, prior to the actual generation of the of the initial data capture record and the post-access data capture record. As shown in the illustrative example of FIG. 3, if the data item(s) for which access is requested includes any content that is critical, sensitive, and/or confidential (whether identified as such through pre-set designations stored on the data capture module, or by virtue of an analysis/evaluation of the content and/or data item properties, or otherwise), a first content type for the generated records is determined in step 320. On the other hand, if, based on the analysis of the one or more data items, that the one or more data items are determined by the data capture module to not include any critical, sensitive, and/or confidential, a second content type is determined for the generated initial data capture record and the generated post-access data capture record. Critical, sensitive, and/or confidential are just illustrative examples of nomenclature, and it is to be understood that other classifications or distinction may function to differentiate various data item(s) and/or the determination of system appropriate capture functions, and that such variations are envisioned and within the scope of this disclosure.

In some examples, multiple types of capture records may be determined based on the analysis. In these embodiments, however, the methods and systems may advantageously provide an appropriate level of data preservation in the initial and/or post-access capture records, for example to provide more comprehensive and thorough review capabilities for sensitive information, or preserving some information while not consuming excessive system resources for data items without the sensitive information. Thus, in these examples one type of data capture record will be more voluminous and/or extensive than another possible type or types.

In sum, in these embodiments, the method may include the generation of a first type of initial data capture record in step 322A for, e.g. sensitive data items, and the generation of a second type of initial data capture record in step 322B for, e.g. non-sensitive data items. In this example, the steps 324A/324B and 326A/326B may correspond with the analogous steps 224 and 226 from the example of FIG. 2. This example also analogously sends the generated data capture records to the data preservation module in steps 330A and 328B.

In the example of FIG. 3, however, the method includes an additional possible step 328A, where the generated capture records are encrypted. This advantageously helps further ensure a user does not improperly or inadvertently access/modify the capture records after the fact (even beyond the isolation/segregation of the data preservation module, in examples where it is so isolated), for example if a user desired to obscure improper modifications to the data items. In some examples, 256 bit symmetric encryption is used, while in other 128 bit encryption is used. In other example, the encryption may be asymmetric, utilize known encryption methods such as Pure Cyrpto Project encryption, and the like. In some examples, the system may determine, prior to the encryption of the generated initial data capture record and the generated post-access data capture record, based on an analysis of the one or more data items, the level of encryption used to encrypt the initial data capture record and the post-access data capture record. In various examples, the records may be encrypted two or more times. The encryption may be performed by the data capture module, the data preservation module, or even both. In some examples, the capture records are compressed prior to encryption.

Figure 4:
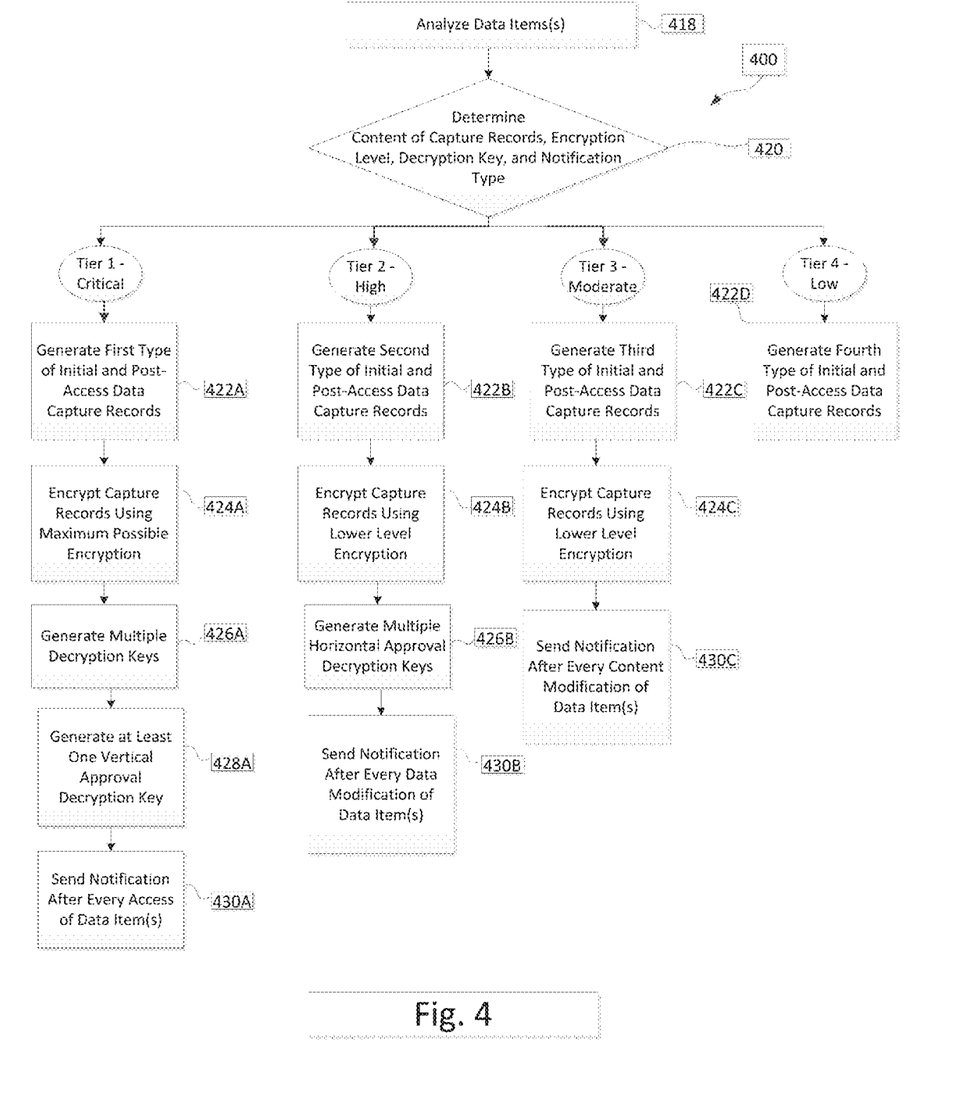
FIG. 4 is a flowchart of an example method that may be implemented in accordance with one or more embodiments of the automated data capture system.

In another representative example, FIG. 4 illustrates another example implementation performed by an embodiment of the automated data capture system (method 400). In this example, after the analysis of the data item(s) in step 420, the data capture module determines, based on the analysis, the content of the capture records, the encryption level, the decryption keys, and the sent notification type (if any). In this example, the determination includes assigning the data item(s) into a tier or category. The number and types of tiers can vary based on the type of data items stored on the data system. In this example, and for illustrative purposes only, the system may assign one of four possible tiers, a first tier for "critical" data items, a second tier for "high" importance data items, a third tier for "moderate" importance data items, and a fourth tier for "low" importance data items. In these and similar examples, the system may then take an action or a plurality of actions based on the determined tier. Thus, for the first tier (or whatever the highest level tier or category is designated) the system may provide the highest level of security, encryption, data preservation and/or notification. At lower levels of importance, more basic procedures can be implemented to not needlessly over-allocate system resources to the generation and storage of capture records, encryption, and/or related notifications. For example, for a lower level data item the system may simply capture the metadata, rather than the contents of the data item, and not encrypt the record or send a notification as a result of the access or modification.

In this example, in the first tier, the data capture module generates a first type of initial and post-access data capture records (e.g. a full forensic copy of the data items) in step 422A, then encrypts the capture records using the maximum possible encryption (whether by the data access module or the data preservation module after receipt) in step 424A, and then generates multiple decryption keys (e.g. split keys) necessary to decrypt the encrypted files in step 426A. Subsequently or as part of step 426A, the system generates at least one vertical approval key (e.g. a key is sent to higher level personnel than the user that is accessing/modifying the data item(s), such that the data capture records cannot be accessed without a superior's approval) in step 428A. In some examples, split keys are sent to the user/modifier and the user's manager, and/or other personnel to frustrate any attempted collusion directed to later accessing the generated capture records on the data preservation device.

In this example, a notification is also sent in step 430A. The notification may be sent to a variety of entities, and in response to various changes. In some examples, the notification is sent higher level personnel (for example the recipient of a vertical approval key, and can be sent in conjunction with the key), the creator of the data item, and the like. In some examples, such as the example of step 430A, a notification is sent after every instance that the data item is accessed. In other embodiments, the data capture module analyzes whether changes are made to the document, and/or if particular changes are made (such as changes to important data) to determine whether a notification should be sent. In some examples, the notification is sent so that an owner or other approved user may review any changes prior to a final disposition. In these examples, the modified data item may be stored in a queue, in addition to or in conjunction with a copy of the original data item, such that the prior data item may be quickly restored if desired. In some examples, the copy or the actual original data item is then deleted and/or replaced by the modified item if the changes are approved.

In the same example of FIG. 4, in the second tier, the data capture module generates a second type of initial and post-access data capture records (e.g. a metadata capture or some other lower content data capture record type as compared to the first type determined for use in the top tier) in step 422B, then encrypt the records using a lower level encryption in step 424B (e.g. in step 424A for the first tier, 256 bit encryption is used, while in step 424B for the second tier, 128 bit encryption is used), and generates multiple horizontal approval decryption keys in step 426B (as in this example, while vertical approval is not required, multiple, split keys are needed to decrypt the encrypted records, which still hinder improper attempts to access the data capture records after the fact). Finally, in this example, for the second tier a notification is sent after the system determines a modification to the data item is made (e.g. by analysis of the data items after access is terminated as compared to a prior version, or by analysis of log commands, and so on).

In the same example of FIG. 4, in the third tier, the data capture module generates a third type of initial and post-access data capture records (e.g. an even lower content data capture record type as compared to the second tier determined type) in step 422C, encrypts using a lower level encryption in step 424C, and sends a notification after the content of the data items is modified (as opposed to structure modifications) in step 430C. Finally, in this example, in the fourth tier, no notifications are sent and no encryption is performed, and the only step is the generation of a fourth type of initial and post-access data capture records in step 422D.

In some examples, the "tiers," and/or the particular system actions to be performed for particular data items and/or modifications may be preset by an administrator, organizational unit, the original data items owner/creator, and the like (e.g. an owner may classify an item as tier 1, or may specify for one or more data item(s) that the system capture a full forensic copy, use maximum encryption, and send a notification to the owner in response to any modification). This can provide flexibility for efficient allocation and use of technical resources based on the number of data items, the frequency of modifications/access, the types of modifications typically made to the data items, the importance/sensitivity of the data, the size/type of file, and the like.

As some examples, any data items related to an organizational unit may be classified as being in a high tier, or requiring more intensive data capture/encryption/notification procedures, or any particular types of data items can be so classified. The settings may be adjusted or altered over time. Indeed, actions taken to discern and evaluate one set of modifications to a certain kind of data items may be excessive or otherwise undesired for other modifications to another kind of data items.

In other examples of the system, rather than assigning tiers, or using similar processes where the system analyzes the data items and then determines a set of appropriate actions to be performed, in some examples the system analyzes the data item(s) at multiple points throughout the data capture process. For example, in FIG. 5, example processes and decisioning methods for system embodiments are illustrated. In this example, the data capture module analyzes the data item(s) in step 518. Next the system may conduct one or more steps of, based on the analysis, determining the content of the capture records (step 520), determining the encryption level, if any, (step 540), determining the key requirements, if any, (step 550, where this may be also be subsumed in step 540 and based on a single iteration of the analysis) and determining the notification type, if any (step 560).

Figure 5:
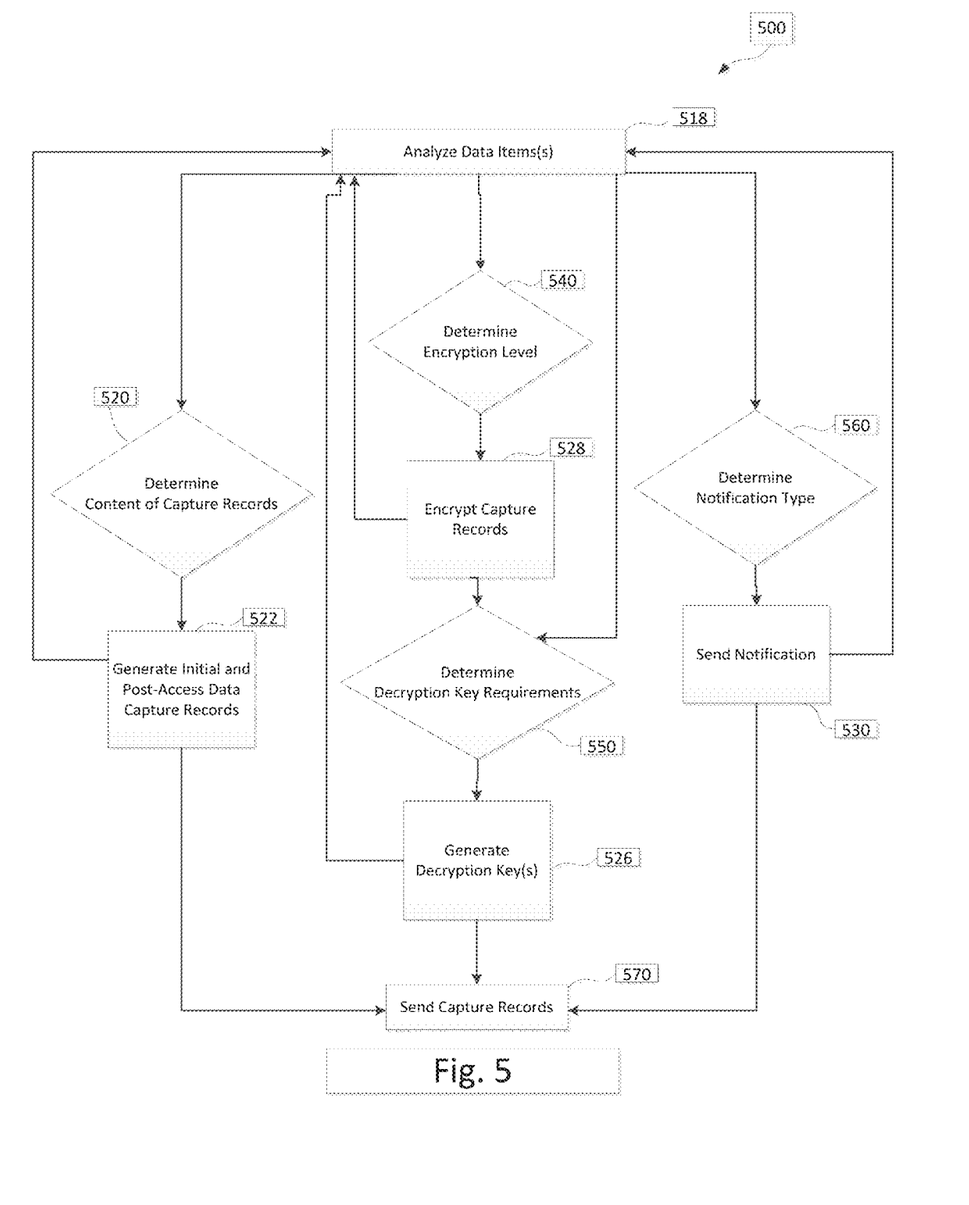
FIG. 5 is a flowchart of an example method that may be implemented in accordance with one or more embodiments of the automated data capture system.

One or more of these determinations may occur after each instance of the analysis of the data item(s), e.g. the system analyzes the data item(s), determines the type of capture records, generates the capture records, then analyzes the data items again, and then determines, for example, whether a notification should also be generated, and if so what kind. The subsequent analysis or analyzes may evaluate different proprieties or aspects of the data items as appropriate for the particular determination. This provides additional flexibility for various functionalities of the system that can account for particular organization needs and/or technical set-ups and limitations thereof (e.g. bandwidth capabilities of network 190, storage capacity of a data preservation server module, and the like).

As a representative example, as discussed herein, in some embodiments of the system, the instructions cause the system to, responsive to a determination, based on the analysis of the one or more data items, that the one or more data items include critical, sensitive, or confidential data, or a combination thereof, the level of encryption is 256 bit symmetric encryption, and the initial data capture record and the post-access data capture record include a full forensic copy of the one or more data items. But, to limit the storage needs for the data preservation module and the reduce the system resources needed for the encryption of various data capture records that are generated when data items are accessed, more basic settings may be utilized for less sensitive files. For example, the system may, responsive to a determination, based on the analysis of the one or more data items, that the one or more data items do not include critical, sensitive, or confidential data, or a combination thereof, the level of encryption is 128 bit symmetric encryption, and the initial data capture record and the post-access data capture record include a command log of any commands executed by the data access device after the access request was granted.

In accordance with another aspect of the system, some in some embodiments the system includes particular devices configured to interact with each other, or may constitute a data capture device/module that is configured to work with other, external devices, such as a data access device, and/or a data preservation device (e.g. a centralized, secure storage server). In an example of these systems, instructions stored on the data capture module, when executed, cause it to perform one or more steps described above. In other examples, the data capture methods include receiving, by the data capture device, an access request from a data access device, the access request being directed to one or more data items stored on the data capture device.

Next, the data capture device may grant the access request. Subsequently, the data access device modifies the one or more data items through one or more modification commands. Then, responsive to a determination that the one or more data items are no longer being modified (e.g. determining the item is no longer being accessed, determining the item has not been modified for a time period indicating further changes are unlikely, such as 10 minutes, 30 minutes, an hour, and the like, or via other analysis methods), the data capture device generates a post-modification data capture record for the one or more data items.

Subsequently, the data capture device may send the post-modification data capture record to a data preservation device. In various embodiments, the data capture device may further generate an initial data capture record and send the initial data capture record to the data preservation device. In various examples, the data capture device also sends a notification that the one or more data items were modified.

In certain examples, the post-modification data capture record includes a log of the one or more modification commands. In this manner, an initial data capture record may not be necessary at all, or only for, e.g. more important/sensitive data or larger/complicated data files, as the modification command log, in conjunction with the still existing, edited data item still stored on the data capture device, may provide sufficient ability to evaluate changes and modifications that were made. This may further advantageously limit the resources consumed by the data capture methods. Similarly, even for other types of data capture records, relying solely on a post-access capture may sufficiently provide the ability to review changes, by examining the final form of the data item and analyzing, via a comparison, the various post-access capture records to trace back all changes that were made, and by what user and/or data access device.

In yet another example, the data capture device may receive an access request from a data access device, grant the access request, and then receive a modification request from the data access device (e.g. a command that will modify the structure, content, or one or more properties of the data item, such as a "delete" command, an alteration to a security setting, and the like). In this example, the data capture device generates an initial data capture record for the one or more of the data items that are the subject of the modification request, and subsequent to the generation, grants the modification request. Then, the data capture device may generate a post-modification data capture record for the one or more data items that were the subject of the granted modification request, and send the capture records to a data preservation device.

As in other examples, the data capture device may then send a notification that the one or more data items were modified. In certain examples, the data capture device may analyze the granted modification request, and determine, based on the analysis, the type of notification to be sent in response to the modification prior to generating and sending the notification, or determine whether a notification should be sent at all. In other examples, the analysis may be based on the content of the data items, rather than the modifications thereto, and the data capture device may determine, based on the content, the type of type of notification to be sent prior to generating and sending the notification, or determine whether a notification should be sent at all.

The device or system may perform these steps upon each modification command, for certain modification commands or requests (such as those that alter the content of the data item, e.g. a "delete" or "put" command, or those that alter the structure, and the like (where the device may analyze each command and evaluate whether it meets the modification criteria necessary for generation of a capture record)), or periodically to provide representative capture records (e.g. every fifth modification command, every tenth modification command, or as otherwise is appropriate for the particular system and data items).

The descriptions above provide examples of the systems, as well as methods and/or method steps that may be performed by these systems, or modules and/or devices configured to function as part of such systems. In other embodiments, the systems may include additional components and features described above in relation to other aspects, modules, and/or devices. Any of the features or components discussed in the embodiments providing examples of the method aspects may be features of embodiments of the systems, devices, or modules thereof, and vice versa. Relatedly, in other examples, the methods may include additional combinations or substitutions of some or all of the steps, components and features described above. Moreover, additional and alternative suitable variations, features, aspects and steps for the systems and methods may be recognized by those skilled in the art given the benefit of this disclosure.

What is claimed is:

1. An automated forensic data capture system comprising:
at least one processor;
a communication interface communicatively coupled to the at least one processor; and
memory storing computer-readable instructions that, when executed by the at least one processor, cause the system to:
receive, via the communication interface, an access request from a data access module, the access request being directed to one or more data items stored on the data capture system;
determine, based on an analysis of the one or more data items, content for an initial data capture record and a level of encryption for the initial data capture record;

generate the initial data capture record for the one or more data items, the initial data capture record comprising the determined content for the initial data capture record;

encrypt the initial data capture record using the determined level of encryption for the initial data record capture;

send, via the communication interface, the initial data capture record to an isolated data preservation module, wherein the data preservation module is isolated such that the data access module cannot access the data preservation module;

subsequent to the generation of the initial data capture record, grant the access request;

determine, based on an analysis of the one or more data items, content for a post-access data capture record and a level of encryption for the post-access data capture record;

responsive to a determination that the one or more data items are no longer being accessed, generate the post-access data capture record for the one or more data items, the post-access data capture record comprising the determined content for the post-access data record capture;

encrypt the post-access data capture record using the determined level of encryption for the post-access data record capture; and send, via the communication interface, the post-access data capture record to the data preservation module;

wherein, responsive to a determination, based on the analysis of the one or more data items, that the one or more data items consist of or comprise critical, sensitive, or confidential data, or a combination thereof, the level of encryption is 256 bit symmetric encryption, and the initial data capture record and the post-access data capture record comprise a full forensic copy of the one or more data items; and wherein, responsive to a determination, based on the analysis of the one or more data items, that the one or more data items do not consist of or comprise any critical, sensitive, or confidential data, or a combination thereof, the level of encryption is 128 bit symmetric encryption, and the initial data capture record and the post-access data capture record comprise a command log of any commands executed by the data access module after the access request was granted.

2. The system of claim 1, wherein the content of the initial data capture record and the post-access data capture record comprises a full forensic copy of the one or more data items, a content copy of the one or more data items, a content copy of information in the one or more data items designated as capture information, a structure copy of the one or more data items, a screen-shot of the one or more data items, a metadata capture of the one or more data items, a command log of commands executed by the data access module after the access request was granted, or a combination thereof.

3. The system of claim 1, wherein the instructions, when executed by the at least one processor, further cause the system to generate multiple decryption keys, and wherein the initial data capture record and the post-access data capture record are encrypted such that the multiple decryption keys are required to decrypt the initial data capture record and the post-access data capture record.

4. The system of claim 3, wherein the instructions, when executed by the at least one processor, further cause the system to:

determine, prior to generation of the multiple decryption keys and based on the analysis of the one or more data items, types for the multiple decryption keys.

5. The system of claim 4, wherein, responsive to the determination that the one or more data items consist of or comprise critical, sensitive, or confidential data, or a combination thereof, the types for the multiple decryption keys include one or more vertical approval keys; and wherein, responsive to the determination that the one or more data items do not consist of or comprise critical, sensitive, or confidential data, or a combination thereof, the types for the multiple decryption keys include one or more horizontal approval keys.

6. The system of claim 1, wherein the instructions, when executed by the at least one processor, further cause the system to:

responsive to a determination that the one or more data items are no longer being accessed by the data access module, send, via the communication interface, a notification that the one or more data items were accessed.

7. A method comprising:

receiving, by a data capture device, an access request from a data access device, the access request being directed to one or more data items stored on the data capture device;

granting, by the data capture device, the access request;

modifying, by the data access device, the one or more data items through one or more modification commands;

determining, based on an analysis of the one or more data items, content for a post-modification data capture record;

responsive to a determination that the one or more data items are no longer being modified, generating, by the data capture device, the post-modification data capture record for the one or more data items, the post-modification data capture record comprising the determined content for the post-modification data capture record;

determining, based on the analysis of the one or more data items, types for multiple decryption keys;

generating multiple decryption keys, using the determined types of decryption keys;

encrypting the post-modification data capture record such that the multiple decryption keys are required to decrypt the post-modification data capture record; and sending, by the data capture device, the post-modification data capture record to a data preservation device;

wherein, responsive to a determination, based on the analysis of the one or more data items, that the one or more data items consist of or comprise critical, sensitive, or confidential data, or a combination thereof, a first content type is determined for the generated post-modification data capture record and the types for the multiple decryption keys include one or more vertical approval keys; and wherein, responsive to a determination, based on the analysis of the one or more data items, that the one or more data items do not consist of or comprise any critical, sensitive, or confidential data, or a combination thereof, at least a second content type is determined for the generated post-modification data capture record and the types for the multiple decryption keys include one or more horizontal approval keys.

8. The method of claim 7, wherein the post-modification data capture record comprises a log of the one or more modification commands.

9. The method of claim 7, further comprising:
sending, by the data capture device, a notification that the one or more data items were modified.

10. The method of claim 7, further comprising:
generating, by the data capture device and prior to granting the access request, an initial data capture record for the one or more data items; and
sending, by the data capture device, the initial data capture record to the data preservation device.

11. The method of claim 7, wherein the one or more data items comprise one or more message records, web service call records, document records, or record files.

12. A method comprising:
receiving, by a data capture device and from a data access device, an access request directed to data items stored on the data capture device;
granting, by the data capture device, the access request;
receiving, by the data capture device and from the data access device, a modification request directed to the data items;
determining, based on an analysis of the one or more data items, content for an initial data capture record and a level of encryption for the initial data capture record;
generating, by the data capture device, the initial data capture record for one or more of the data items subject to the modification request, the initial data capture record comprising the determined content for the initial data capture record;
encrypting the initial data capture record using the determined level of encryption for the initial data record capture;
subsequent to generating the initial data capture record, granting, by the data capture device, the modification request;
determining, based on an analysis of the one or more data items, content for a post-modification data capture record and a level of encryption for a post-modification data capture record;
generating, by the data capture device, the post-modification data capture record for the one or more of the data items subject to the modification request, the post-modification data capture record comprising the determined content for the post-modification data capture record;
encrypting the post-modification data capture record using the determined level of encryption for the post-modification data record capture; and
sending, by the data capture device, the initial data capture record and the post-modification data capture record to a data preservation device;
wherein, responsive to a determination, based on the analysis of the one or more data items, that the one or more data items consist of or comprise critical, sensitive, or confidential data, or a combination thereof, the level of encryption is 256 bit symmetric encryption, and the initial data capture record and the post-modification data capture record comprise a full forensic copy of the one or more data items; and
wherein, responsive to a determination, based on the analysis of the one or more data items, that the one or more data items do not consist of or comprise any critical, sensitive, or confidential data, or a combination thereof the level of encryption is 128 bit symmetric encryption, and the initial data capture record and the post-modification data capture record comprise a command log of any commands executed by the data access device after the access request was granted.

13. The method of claim 12, further comprising:
sending, by the data capture device, a notification that the one or more of the data items were modified.

14. The method of claim 12, further comprising:
analyzing, by the data capture device, the modification request;
determining, by the data capture device and based on the modification request, a type of notification to be sent in response to the modification; and
sending, by the data capture device, a notification, of the type, that the one or more of the data items were modified.

15. The method of claim 12, further comprising:
determining, by the data capture device, based on content of the one or more of the data items, a type of notification to be sent in response to the granting the modification request; and
sending, by the data capture device, a notification of the determined type.

16. The method of claim 7, wherein the post-modification data capture record comprises a full forensic copy of the one or more of the data items, a content copy of the one or more of the data items, a content copy of information in the one or more of the data items designated as capture information, a structure copy of the one or more of the data items, a screen-shot of the one or more of the data items, a metadata capture of the one or more of the data items, a command log of commands executed by the data access device after the access request was granted, or a combination thereof.

\* \* \* \* \*